US010569785B2

(12) United States Patent
Dudar (10) Patent No.: US 10,569,785 B2
(45) Date of Patent: Feb. 25, 2020

(54) ROAD WATER DETECTION

(71) Applicant: Ford Global Technologies, LLC, Dearborn, MI (US)

(72) Inventor: Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 324 days.

(21) Appl. No.: 15/499,255

(22) Filed: Apr. 27, 2017

(65) Prior Publication Data

US 2018/0312165 A1     Nov. 1, 2018

(51) Int. Cl.
*B60W 40/06* (2012.01)
*B60C 23/04* (2006.01)
*G01C 21/34* (2006.01)
*B60G 17/00* (2006.01)
*G06K 9/00* (2006.01)

(52) U.S. Cl.
CPC ............ *B60W 40/06* (2013.01); *B60C 23/04* (2013.01); *B60G 17/00* (2013.01); *G01C 21/3415* (2013.01); *G06K 9/00791* (2013.01); *B60G 2500/30* (2013.01); *B60W 2510/068* (2013.01); *B60W 2530/20* (2013.01)

(58) Field of Classification Search
CPC ........... B60W 40/06; B60W 2510/068; B60W 2530/20; G01C 21/3697; G01C 21/3415; B60G 17/0195; B60G 17/00; B60G 2401/142; B60G 2400/52; B60G 2500/30; B60C 23/04; G06K 9/00791
See application file for complete search history.

(56) References Cited

U.S. PATENT DOCUMENTS

| 7,902,969 | B2 | 3/2011 | Obradovich |
| 9,227,479 | B2 | 1/2016 | Clarke et al. |
| 9,545,927 | B2 | 1/2017 | Fairgrieve et al. |
| 9,600,997 | B1 * | 3/2017 | Abrahams ............. G08B 21/10 |
| 2005/0099276 | A1 * | 5/2005 | Fujioka ............... B60C 23/0408 340/426.19 |
| 2012/0070071 | A1 * | 3/2012 | Rankin ............. G06K 9/00805 382/154 |

(Continued)

FOREIGN PATENT DOCUMENTS

| DE | 102014200167 A1 * | 7/2015 | ............ F01N 11/002 |
| GB | 2307555 A | 5/1997 | |

(Continued)

OTHER PUBLICATIONS

"Range Rover Sport", © Jaguar Land Rover Limited 2016, Publication No. LRML 5256/16 (114 pages).
GB Search Report dated Oct. 19, 2018 re GB Appl. No. 1806665.4.

*Primary Examiner* — Genna M Mott
(74) *Attorney, Agent, or Firm* — Frank A. MacKenzie; Bejin Bieneman PLC (57) ABSTRACT

A vehicle computer includes a memory and a processor programmed to execute instructions stored in the memory. The instructions include receiving a first tire pressure measurement at a first time, receiving a second tire pressure measurement at a second time, comparing the first tire pressure measurement to the second tire pressure measurement, and determining that a road is flooded based on a difference of the first tire pressure measurement and the second tire pressure measurement.

20 Claims, 3 Drawing Sheets

(56) References Cited

U.S. PATENT DOCUMENTS

| | | | |
|---|---|---|---|
| 2014/0156126 A1* | 6/2014 | Tran | B60G 17/0165 |
| | | | 701/22 |
| 2016/0196656 A1* | 7/2016 | Cund | B60W 40/06 |
| | | | 348/148 |
| 2016/0264142 A1 | 9/2016 | DiMiro et al. | |
| 2017/0236210 A1* | 8/2017 | Kumar | B60W 10/04 |
| | | | 705/4 |
| 2018/0128634 A1* | 5/2018 | Nakamura | G01C 21/3461 |

FOREIGN PATENT DOCUMENTS

| | | | |
|---|---|---|---|
| GB | 2523094 A | 8/2015 | |
| JP | H05319040 A | 3/1993 | |
| JP | 2002240520 A | 8/2002 | |
| JP | 2008280038 A | 11/2008 | |
| WO | WO 2003002378 A1 | 1/2003 | |
| WO | WO 2016134802 A1 | 9/2016 | |

* cited by examiner

ROAD WATER DETECTION

BACKGROUND

The Society of Automotive Engineers (SAE) has defined multiple levels of autonomous vehicle operation. At levels 0-2, a human driver monitors or controls the majority of the driving tasks, often with no help from the vehicle. For example, at level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention.

DETAILED DESCRIPTION

Driving on a flooded road can cause vehicle damage. Specifically, the engine can be damaged by water entering the engine cylinders through the intake manifold, resulting in hydrolock. Flooded roads should therefore be avoided. Detecting a flooded road, however, is sometimes challenging for autonomous vehicles and for human drivers.

One solution involves a flood detection system that detects when a vehicle is driving on a flooded road. An example flood detection system is implemented with a vehicle computer having a memory and a processor programmed to execute instructions stored in the memory. The instructions include receiving a first tire pressure at a first time, receiving a second tire pressure at a second time, comparing the first tire pressure to the second tire pressure, and determining that a road is flooded based on a difference of the first tire pressure and the second tire pressure.

Comparing the first tire pressure to the second tire pressure may include determining a rate of change of the second tire pressure relative to the first tire pressure, comparing the rate of change to a predetermined threshold, determining that the rate of change exceeds the predetermined threshold, and determining that the road is flooded as a result of determining that the rate of change exceeds the predetermined threshold.

The instructions may further include confirming that the road is flooded. The first tire pressure and the second tire pressure may be received from a first tire pressure sensor. Confirming that the road is flooded may include receiving a first tire pressure from a second tire pressure sensor, receiving a second tire pressure from the second tire pressure sensor after receiving the first tire pressure from the second tire pressure sensor, comparing the first tire pressure received from the second tire pressure sensor to the second tire pressure received from the second tire pressure sensor; and determining that the road is flooded based on the difference of the first and second tire pressures received from the first tire pressure sensor and further based on a difference of the first and second tire pressures received from the second tire pressure sensor.

Confirming that the road is flooded may also or alternatively include receiving a first exhaust gas temperature, receiving a second exhaust gas temperature after receiving the first exhaust gas temperature, comparing the first exhaust gas temperature to the second exhaust gas temperature, and determining that a road is flooded based on a difference of the first exhaust gas temperature and the second exhaust gas temperature.

In another possible implementation, confirming that the road is flooded may include comparing images of an area around a host vehicle and determining that the road is flooded based on similarities in the images resulting from flood water hiding distinguishing road features.

The instructions may further include determining a water depth. Determining the water depth may include querying a remote server and determining the water depth from a response received from the remote server. Alternatively or in addition, determining the water depth may include estimating the water depth based at least in part on the difference of the first tire pressure and the second tire pressure. In another possible approach, determining the water depth may include estimating the water depth based at least in part on a difference of a first exhaust gas temperature to a second exhaust gas temperature.

The instructions may further include adjusting a ground clearance of a host vehicle. Adjusting the ground clearance of the host vehicle may include commanding a suspension system controller to increase the ground clearance.

The instructions executed by the processor may further include determining that a host vehicle is operating in an autonomous mode. In that case, the instructions may include comparing a water depth to a predetermined threshold, determining that the water depth exceeds the predetermined threshold, and commanding an autonomous mode controller to seek a different route as a result of determining that the water depth exceeds the predetermined threshold.

The instructions executed by the processor may further include determining that a host vehicle is operating in a non-autonomous mode and commanding a user interface to present an alert representing at least one of an indication that the road is flooded, a water depth, an indication of whether the host vehicle can traverse the road, and a recommendation of a different route.

An example method includes receiving a first tire pressure at a first time, receiving a second tire pressure at a second time, comparing the first tire pressure to the second tire pressure, and determining that a road is flooded based on a difference of the first tire pressure and the second tire pressure.

In the method, comparing the first tire pressure to the second tire pressure may include determining a rate of change of the second tire pressure relative to the first tire pressure, comparing the rate of change to a predetermined threshold, determining that the rate of change exceeds the predetermined threshold, and determining that the road is flooded as a result of determining that the rate of change exceeds the predetermined threshold.

Confirming that the road is flooded may be based at least in part on at least one of exhaust gas temperatures and images captured by a camera.

In some possible approaches, the method may include determining a water depth, comparing a water depth to a predetermined threshold, determining that the water depth exceeds the predetermined threshold, and commanding an autonomous mode controller to seek a different route as a result of determining that the water depth exceeds the predetermined threshold.

In other possible implementations, the method may include determining that a host vehicle is operating in a non-autonomous mode and commanding a user interface to present an alert representing at least one of an indication that the road is flooded, a water depth, an indication of whether the host vehicle can traverse the road, and a recommendation of a different route.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
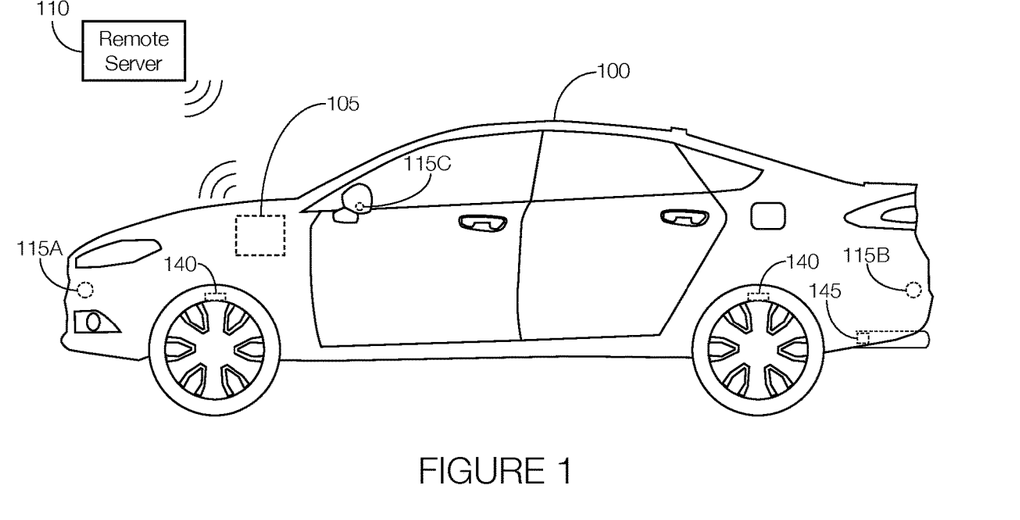
FIG. 1 illustrates an example autonomous vehicle that uses tire pressure data to detect a flooded road.
Figure 2:
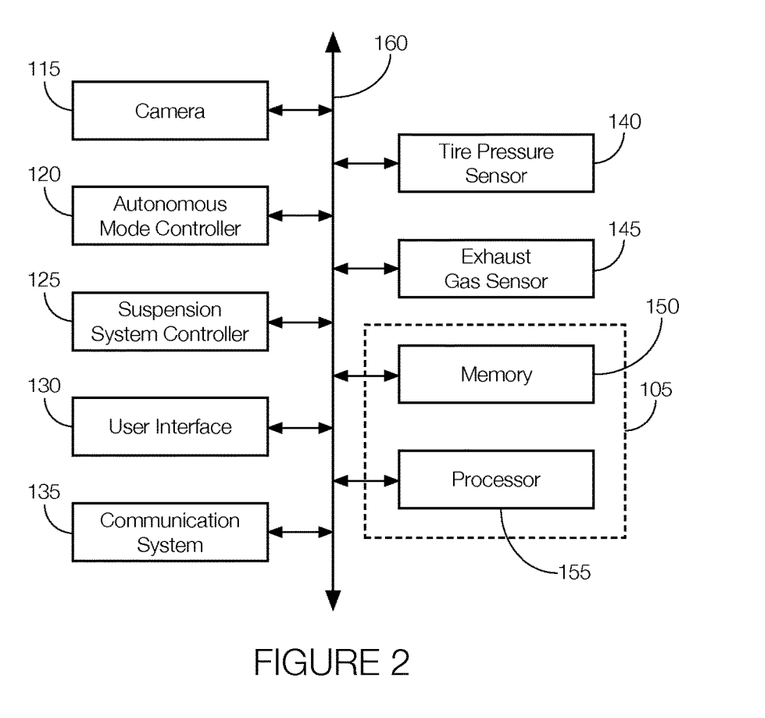
FIG. 2 is a block diagram of an example flood detector that may be incorporated into the autonomous vehicle of FIG. 1.

With reference to FIGS. 1 and 2, a host vehicle 100 includes a flood detection system 105 that detects when the host vehicle 100 is traveling on a flooded road. The flood detection system 105 detects the flood based on a change in tire pressure, exhaust gas temperature, images of an area surrounding the host vehicle 100, or a combination thereof. The flood detection system 105 may also determine the depth of the flood water using sensor data or by querying a remote server 110, which is a computer (e.g., a cloud-based computer) in wireless communication with the host vehicle 100 and may transmit weather data, traffic data, etc., to the host vehicle 100. The flood detection system 105 warns a human driver of the flooded road and the water depth, if known. If the host vehicle 100 is operating autonomously, the flood detection system 105 causes the host vehicle 100 to seek a different route if, e.g., the water depth is greater than a predetermined threshold.

Although illustrated as a sedan, the host vehicle 100 may include any passenger or commercial automobile such as a car, a truck, a sport utility vehicle, a crossover vehicle, a van, a minivan, a taxi, a bus, etc. As discussed in greater detail below, the host vehicle 100 is an autonomous vehicle that can operate in an autonomous (e.g., driverless) mode, a partially autonomous mode, and/or a non-autonomous mode. The partially autonomous mode may refer to the SAE Level 2 mode of operation where the host vehicle 100 can control steering, acceleration, and braking under certain circumstances without human interaction. The partially autonomous mode may further refer to the SAE Level 3 mode of operation where the host vehicle 100 can handle steering, acceleration, and braking under certain circumstances, as well as monitoring of the driving environment, even though some human interaction is sometimes needed.

Components of the flood detection system 105 may communicate with components of the host vehicle 100 such as a camera 115, an autonomous mode controller 120, a suspension system controller 125, a user interface 130, a communication system 135, at least one tire pressure sensor 140, and at least one exhaust gas sensor 145. The flood detection system 105 may include a memory 150 and a processor 155. The components may be in communication over a vehicle communication network 160. The communication network 160 includes hardware, such as a communication bus, for facilitating communication among vehicle components. The communication network 160 may facilitate wired or wireless communication among the vehicle components in accordance with a number of communication protocols such as controller area network (CAN), Ethernet, WiFi, Local Interconnect Network (LIN), and/or other wired or wireless mechanisms.

The camera 115 is a vision sensor. The camera 115 may capture images of the ground near the host vehicle 100. To capture such images, the camera 115 may include a lens that projects light toward, e.g., a CCD image sensor, a CMOS image sensor, etc. The camera 115 processes the light and generates the image. The image may be output to the processor 155 and, as discussed in greater detail below, can be used to determine if the road is flooded. The host vehicle 100 may include any number of cameras 115, and different cameras 115 may point in different directions. For instance, a first camera 115A may capture images of the road ahead of the host vehicle 100, a second camera 115B may capture images of the road next to the host vehicle 100, and a third camera 115C may capture images of the road behind the host vehicle 100. A flooded road may look the same in each image captured. For instance, distinguishing features of sections of the road, such as lane markers, potholes, cracks, etc., may not show up in images of a flooded road. A non-flooded road may look different in each image captured since the distinguishing features will be present in the image. Therefore, the images captured by the cameras 115 may be used to determine if the road is flooded.

The autonomous mode controller 120, implemented via circuits, chips, or other electronic components, is programmed to carry out various operations of the host vehicle 100. The autonomous mode controller 120 is a computing device that is programmed to transmit control signals to various devices in the host vehicle 100. Examples of such devices may include sensors, actuators, or the like. The autonomous mode controller 120 may be programmed to receive messages from various devices in the host vehicle 100. Examples of such devices may include vehicle sensors, including the cameras 115 discussed above as well as other types of sensors such as, e.g., other vision sensors, lidar sensors, radar sensors, ultrasound sensors, or the like. Other devices in communication with the autonomous mode controller 120 may include a navigation system, such as a satellite-based navigation system including the Global Positioning System (GPS). The autonomous mode controller 120 may communicate with the navigation system to determine the present location of the host vehicle 100 and develop routes to a vehicle destination. In operation, the autonomous mode controller 120 may receive data from the sensors and the navigation system, process the data received, and output control signals to the actuators to control the braking, propulsion, and steering of the host vehicle 100 in an autonomous mode (i.e., without driver interaction or with only little driver interaction) in accordance with the sensor data and the navigation system data. Each actuator is controlled by control signals output by the autonomous mode controller 120. Electrical control signals output by the autonomous mode controller 120 may be converted into mechanical motion by the actuators. Examples of actuators may include a linear actuator, a servo motor, or the like. Although one autonomous mode controller 120 is shown in FIG. 2 for ease of illustration, the autonomous mode controller 120 could include, and various operations described herein could be carried out by, one or more computing devices.

The suspension system controller 125 is implemented via circuits, chips, or other electronic components that control the vehicle suspension system. The suspension system controller 125 may be programmed to output control signals to various actuators associated with increasing or reducing the ground clearance of the host vehicle 100. The suspension system controller 125 may be programmed to adjust the ground clearance according to signals received from the autonomous mode controller 120, the processor 155 of the flood detection system 105, or both.

A user interface 130 presents information to and receives information from an occupant of the host vehicle 100. The user interface 130 may be located, e.g., on an instrument panel in a passenger cabin of the host vehicle 100, or wherever may be readily seen by the occupant. The user interface 130 may include dials, digital readouts, screens such as a touch-sensitive display screen, speakers, and so on for providing information to the occupant, e.g., human-machine interface (HMI) elements. The user interface 130 may include buttons, knobs, keypads, microphone, and so on for receiving information from the occupant.

The communication system 135 is implemented via an antenna, circuits, chips, or other electronic components that facilitate wireless communication between the host vehicle 100 and the remote server 110. The communication system 135 may be programmed to communicate in accordance with any number of wired or wireless communication protocols. For instance, the communication system 135 may be programmed to communicate in accordance with a satellite-communication protocol, a cellular-based communication protocol (LTE, 3G, etc.), Bluetooth®, Bluetooth® Low Energy, Ethernet, the Controller Area Network (CAN) protocol, WiFi, the Local Interconnect Network (LIN) protocol, etc. In some instances, the communication system 135 is incorporated into a vehicle telematics unit. The communication system 135 may be programmed to transmit message to the remote server 110 in response to commands received from the processor 155 of the flood detection system 105. Moreover, certain messages received at the host vehicle 100 via the communication system 135 may be stored in the memory 150 of the flood detection system 105, forwarded to the processor 155 of the flood detection system 105, or both.

The tire pressure sensor 140, which may be part of a tire pressure monitoring system (TPMS), is implemented via circuits, chips, or other electronic components that can measure a tire pressure. In some instances, the tire pressure sensor 140 is located inside a vehicle tire. In some implementations, each tire may have a tire pressure sensor 140 measuring the tire pressure of its respective tire. Each tire pressure sensor 140 may be programmed to periodically measure the tire pressure. That is, the tire pressure sensor 140 may be programmed to measure the tire pressure at regular intervals of time. Thus, each tire pressure sensor 140 may be programmed to measure a first tire pressure at a first time and a second tire pressure at a second time. The measurement taken at the second time may occur after the measurement taken at the first time. For instance, the first time may be before the host vehicle 100 reaches the flood water and the second time may be while the host vehicle 100 is driving in the flood water. The tire pressure sensor 140 may be programmed to output signals representing the tire pressure measurements. A first tire pressure signal may represent the measurement of the first tire pressure taken at the first time. A second tire pressure signal may represent the measurement of the second tire pressure taken at the second time. The first tire pressure signal and the second tire pressure signal may be output to the processor 155.

The exhaust gas sensor 145 is implemented via circuits, chips, or other electronic components that can measure the temperature of the exhaust gas. The host vehicle 100 may have multiple exhaust gas sensors 145 as part of its exhaust and emissions control system. One or more exhaust gas sensors 145 may be located in the exhaust line. For instance, at least one exhaust gas sensor 145 may be located in or near the exhaust pipe. Each exhaust gas sensor 145 may be programmed to periodically measure the temperature of the exhaust gas. Thus, each exhaust gas sensor 145 may be programmed to measure a first exhaust gas temperature at a first time and a second exhaust gas temperature at a second time. The measurement taken at the second time may occur after the measurement taken at the first time, and the first and second times the exhaust gas temperature is measured may be the same or different than the first and second times the tire pressures are measured. The exhaust gas sensor 145 may be programmed to output signals representing the exhaust gas temperature measurements. A first exhaust gas temperature signal may represent the measurement of the first exhaust gas temperature taken at the first time. A second exhaust gas temperature signal may represent the measurement of the second exhaust gas temperature taken at the second time. The first exhaust gas temperature signal and the second exhaust gas temperature signal may be output to the processor 155.

The memory 150 is implemented via circuits, chips, or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory 150 may store instructions executable by the processor 155 and data such as weather data, traffic data, location data, tire pressure measurements, exhaust gas temperatures, images captured by the camera 115, water height, etc. The instructions and data stored in the memory 150 may be accessible to the processor 155 and possibly other components of the flood detection system 105, the host vehicle 100, or both.

The processor 155 is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The processor 155 can receive the data from the tire pressure sensors 140 and the exhaust gas sensors 145 and the images from the camera 115 and determine, from the data and images, if the road the host vehicle 100 is on is flooded.

For example, the processor 155 may be programmed to retrieve the tire pressure measurements, exhaust gas temperatures, and images stored in the memory 150. The processor 155 may be programmed to process the tire pressure measurements, exhaust gas temperatures, and images. In some instances, the processor 155 is programmed to determine that a road is flooded from a subset of the tire pressure measurements, the exhaust gas temperatures, and the images. That is, the processor 155 may be programmed to determine that the road is flooded from the tire pressure measurements without considering the exhaust gas temperatures or images. Alternatively, the processor 155 may be programmed to detect the flooded road from the exhaust gas temperatures. In another possible approach, the processor 155 may be programmed to detect the flooded road from the images. In each of these scenarios, one technique (such as processing the tire pressure measurements) may be used to detect the flood and another technique (such as processing the exhaust gas temperature or the images) may be used to confirm the flood.

The processor 155 may be programmed to receive tire pressure measurements at different times. For instance, the processor 155 may be programmed to receive the first tire pressure signal representing the first tire pressure measured at the first time and the second tire pressure signal representing the second tire pressure measured at the second time. The processor 155 may be programmed to compare the first tire pressure to the second tire pressure. Comparing the first tire pressure to the second tire pressure may include the processor 155 processing the first tire pressure signal to get the first tire pressure, processing the second tire pressure signal to get the second tire pressure, and determining if the first tire pressure is different from the second tire pressure.

Determining whether the first tire pressure is different from the second tire pressure may include determining if the tire was quickly cooled. Submerging a tire in water, which will occur when the host vehicle 100 is driven on a flooded road, will cool the tire. The ideal gas law, PV=nRT, shows a relationship between pressure P, volume V, the amount of gas (in moles) in the tire n, the ideal gas constant R, and the temperature T. A sudden drop in temperature while volume, the amount of gas, and the ideal gas constant remain the same will cause the pressure measured by the tire pressure sensor 140 to suddenly drop. The rate of change of the tire pressure drop could indicate that the tire has been submerged in water if, e.g., the rate of change exceeds a predetermined threshold. Therefore, the processor 155 may be programmed to determine or estimate the rate of change of the tire pressure drop of the first tire pressure to the second tire pressure, compare the tire pressure drop to the predetermined threshold, and determine that the host vehicle 100 is on a flooded road if the rate of change of the tire pressure drop exceeds the predetermined threshold.

To rule out potential false positives, the processor 155 may be programmed to determine whether other tire pressure sensors 140 located in different tires, which could include a spare tire in the host vehicle 100, detected a similar tire pressure drop. Thus, the processor 155 may determine whether the tire pressure drop occurred in at least one other tire (i.e., a second tire pressure sensor) since a flooded road will most likely affect more than one tire. Thus, the processor 155 may be programmed to determine if other tire pressure sensors 140 detected the same pressure drop. If the other tire pressure sensor 140 is in the spare tire, the processor 155 may be programmed to determine that the road is flooded based on a difference in the measurements taken by the tire pressure sensor 140 in the spare tire relative to the tire pressure sensor 140 located in a tire touching the ground since it is unlikely that the tire pressure of the spare tire will change because of flood water (unless the spare tire is located below the vehicle body). As such, the processor 155 may detect the flood based on similar pressure drops from other tires touching the ground or from a statistically different pressure difference measured in a tire touching the ground relative to that measured in the spare tire. Further, comparing the pressure of the spare tire to that of the other tires may allow the processor 155 to rule out false positives caused by, e.g., a significant drop in pressure resulting from a hurricane or other strong storm, which would affect all tires, even the spare tire.

The processor 155 may further be programmed to rule out false positives based on the exhaust gas temperature, the images captured by the cameras 115, or both. That is, the processor 155 may detect the flood water using the output of the tire pressure sensor 140 and confirm the flood water based on the exhaust gas temperature, the images captured by the camera 115, or both.

Detecting flood water using the exhaust gas temperature sensor may include receiving the first exhaust gas temperature signal and the second exhaust gas temperature signal at the first time and second time, respectively. The processor 155 may be programmed to compare the first exhaust gas temperature to the second exhaust gas temperature. If the difference between the first exhaust gas temperature and the second exhaust gas temperature exceeds a predetermined threshold in a relatively short period of time (e.g., within a few seconds), the processor 155 may determine that the exhaust pipe is being cooled by flood water.

Detecting the flood water from the images captured by the camera 115 may include comparing images captured of an area in front of, next to, or behind the host vehicle 100. The processor 155 may compare the images to determine if at least two of the images show significant amounts of water or otherwise hide distinguishing road features such as lane markers, potholes, cracks, etc. Thus, the processor 155 may be programmed to determine that the similarities in the images captured means that multiple cameras 115 are capturing images of road water.

The processor 155 may be further programmed to determine the depth of the flood water. The depth may be estimated based on, e.g., the difference between the first and second tire pressure measurements, the difference between the first and second exhaust gas temperatures, or the images captured by the camera 115. For instance, the magnitude of the difference between the first and second tire pressure measurements or the magnitude of the difference between the first and second exhaust gas temperatures may indicate the height of the flood water. More flood water may correlate to a greater magnitude difference in the readings of the tire pressure sensor 140, the exhaust gas sensor 145, or both. That is, the more the tire is submerged in water, the greater the pressure drop when the second tire pressure is measured. Further, only flood water of a certain height may affect the exhaust gas temperature. Thus, if the processor 155 determines that the road is flooded from the output of the exhaust gas sensor 145, the processor 155 may estimate that the flood water is at least as high as, e.g., the exhaust pipe.

Another way to determine the water depth includes the processor 155 querying the remote server 110 for the water depth. The processor 155 may be programmed to command the communication system 135 to transmit the query to the remote server 110. The communication system 135 may receive the response from the remote server 110 and forward the response to the processor 155. The response may include the water depth as measured by other vehicles or otherwise reported to the remote server 110. Thus, the processor 155 may be programmed to determine the water depth from the response from the remote server 110. In instances where the processor 155 estimates the water depth, it may command the communication system 135 to transmit the estimated water depth to the remote server 110.

The processor 155 may be programmed to take certain actions based on, e.g., the height of the flood water, whether the host vehicle 100 is traveling in an autonomous mode, or the like. For example, the processor 155 may be programmed to command the suspension system controller 125 to increase the ground clearance of the host vehicle 100 to minimize the risk of the flood water causing hydrolock. In some instances, the processor 155 may command the suspension system controller 125 to increase the ground clearance if the water height is estimated or otherwise determined to be greater than a predetermined threshold.

Another action taken by the processor 155 may include commanding the user interface 130 to present an alert to the driver of the host vehicle 100. This action may be taken if the processor 155 determines, from signals output by the autonomous mode controller 120, that the host vehicle 100 is operating in a non-autonomous mode. The alert presented on the user interface 130 may indicate the presence of the flood water, the height of the flood water if known, an indication of whether the host vehicle 100 can travel through the flood water without experiencing hydrolock, or the like. The alert may also recommend a different route, especially if the water level exceeds a predetermined threshold. The predetermined threshold may be set according to a minimum water depth associated with causing hydrolock or other damage to the host vehicle 100 given the present ground clearance of the host vehicle 100. Thus, the processor 155 may be programmed to compare the water depth to the predetermined threshold associated with the present ground clearance of the host vehicle 100 and output the alert recommending a different route if the water depth exceeds the predetermined threshold.

The processor 155 may be programmed to instruct the autonomous mode controller 120 to seek a different route if the host vehicle 100 is operating autonomously and if the water level exceeds the predetermined threshold. That is, the processor 155 may output a control signal to the autonomous mode controller 120 indicating that a new route is necessary. The processor 155 may further output the traffic and weather data received from the remote server 110, and the autonomous mode controller 120 or the navigation system may use such data to develop the new route to avoid the flood water and possible flooding on other roads.

Not all flood water may warrant finding a new route, however. The processor 155 may be programmed to permit the host vehicle 100 to travel through the flood water if, e.g., the processor 155 determines that the depth of the flood water is less than the predetermined threshold. In this instance, the processor 155 may send a control signal to the autonomous mode controller 120 permitting the autonomous mode controller 120 to proceed through the flood water. The control signal may limit the autonomous operation of the host vehicle 100 to a lower speed, at least until the host vehicle 100 has traversed the flood water.

Figure 3:
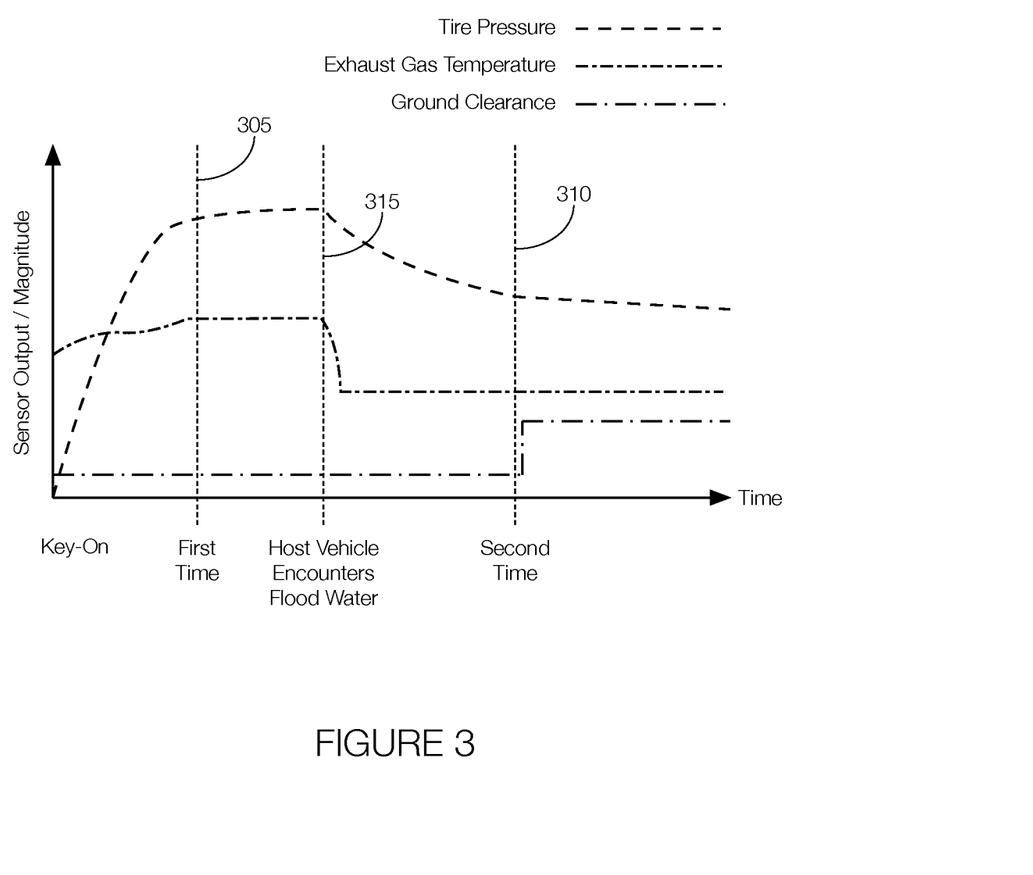
FIG. 3 illustrates graphs showing how a flooded road affects tire pressure and exhaust gas temperature.

FIG. 3 illustrates graphs showing how a flooded road affects tire pressure and exhaust gas temperature. The X-axis represents time and the Y-axis represents the outputs of the tire pressure sensor 140 and the exhaust gas temperature sensor and the magnitude of the ground clearance of the host vehicle 100. Key-on occurs at the origin of the X-axis and the Y-axis. The outputs of both the tire pressure sensor 140 and the exhaust gas temperature sensor level off shortly after key-on occurs. Because the values eventually level off, the tire pressure and exhaust gas temperature will not change much unless the host vehicle 100 enters a flooded road.

The first time 305, where the first tire pressure and the first exhaust gas temperature are measured, occurs after key-on and during the time that the outputs of both sensors have leveled off. At the time shown by line 315 is where the host vehicle 100 enters a flooded road. The outputs of both the tire pressure sensor 140 and the exhaust gas temperature sensor drop. The second time 310, where the second tire pressure and the second exhaust gas temperature are measured, occurs after the host vehicle 100 enters the flood water. The processor 155 compares the outputs of the tire pressure sensor 140 at the first time 305 and the second time 310 and the exhaust gas temperature at the first time 305 and the second time 310, to determine if the road is flooded. The processor 155 may further process the images captured by the cameras 115 to determine or confirm that the road is flooded.

After determining that the host vehicle 100 is driving on a flooded road, the processor 155 may command the suspension system controller 125 to raise the ground clearance of the host vehicle 100. Specifically, FIG. 3 shows that the ground clearance increases after the second time 310.

Figure 4:
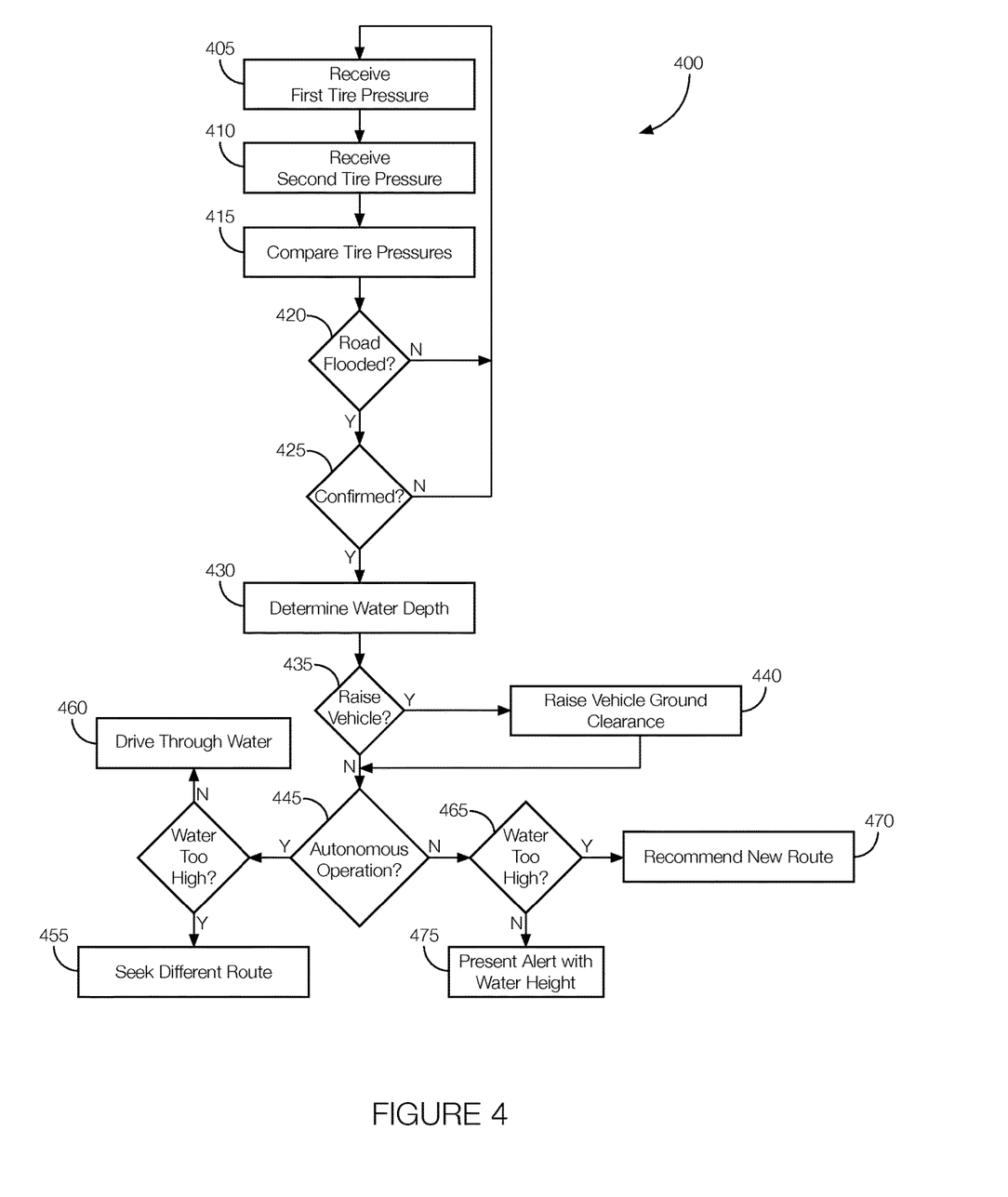
FIG. 4 is a flowchart of an example process that may be executed by the flood detection system.

FIG. 4 is a flowchart of an example process 400 that may be executed by the flood detection system 105. The process 400 may begin after key-on. In some instances, the process 400 may begin after the tire pressure and exhaust gas temperature level off, as shown in FIG. 3. The process 400 may continue to execute until the host vehicle 100 is shut down.

At block 405, the flood detection system 105 receives the first tire pressure. The processor 155 may receive the first tire pressure from the first tire pressure signal output by one or more tire pressure sensors 140 over the communication network 160. The time at which the first tire pressure was measured may be referred to as the first time.

At block 410, the flood detection system 105 receives the second tire pressure. The processor 155 may receive the second tire pressure from the same tire pressure sensor 140 that output the first tire pressure signal over the communication network 160. The processor 155 may determine the second tire pressure from the second tire pressure signal received via the communication network 160. The time at which the second tire pressure was measured may be referred to as the second time.

At block 415, the flood detection system 105 compares the first tire pressure to the second tire pressure. For instance, the processor 155 may compare the first tire pressure to the second tire pressure to determine if the pressure suddenly dropped, which may occur if the tire is at least partially submerged in water. The rate at which the tire pressure dropped (e.g., the rate of change of the second tire pressure relative to the first tire pressure) could indicate that the tire has been submerged in water if, e.g., the rate of change exceeds a predetermined threshold. Therefore, the processor 155 may determine or estimate the rate of change of the tire pressure drop of the first tire pressure to the second tire pressure and compare the tire pressure drop to the predetermined threshold At decision block 420, the flood detection system 105 determines if the road is flooded. For instance, the processor 155 may determine that the road is flooded based on the comparison of the first tire pressure to the second tire pressure. That is, the processor 155 may determine that the road is flooded if the rate of change of the tire pressure drop exceeds the predetermined threshold. If so, the process 400 proceeds to block 425. Otherwise, the process 400 returns to block 405.

At decision block 425, the flood detection system 105 confirms that the road is flooded. The processor 155 may, e.g., process the exhaust gas temperature signals received at the first time and second time (which may or may not be the same "first time" and "second time" at blocks 405 and 410, respectively) and compare the exhaust gas temperatures at those times to determine if the exhaust gas temperature dropped, which it may do if the exhaust pipe is at least partially submerged in water. The processor 155 may also or alternatively confirm that the road is flooded by comparing the tire pressures measured by every tire pressure sensor 140 in the host vehicle 100, which could include a tire pressure sensor 140 located in a spare tire, especially if the tire pressures at blocks 405 and 410 were only from one tire pressure sensor 140. In another possible approach, the processor 155 may process the images captured by the cameras 115 to determine if the host vehicle 100 is surrounded by water. Any one or more of these additional operations may confirm that the road is flooded. If so, the process 400 may proceed to block 430. Otherwise, the process 400 may return to block 405.

At block 430, the flood detection system 105 determines the water depth. The processor 155 may get the water depth by querying the remote server 110 or by estimating the water depth based on, e.g., the magnitude of the change in tire pressure (a greater change in magnitude indicates that the tire is more fully submerged), whether the exhaust gas temperature changed (which may indicate that the water is at least as high as the exhaust pipe), based on the images captured by the cameras 115, etc. With the water depth, the process 400 may proceed to block 435.

At decision block 435, the flood detection system 105 determines whether to raise the host vehicle 100. That is, the processor 155 may compare the water depth determined at block 430 to a predetermined threshold based at least in part on the minimum ground clearance needed given the water depth to avoid damaging the vehicle engine (e.g., prevent hydrolock). If the processor 155 determines that the water depth is not likely to cause hydrolock or other damage to the host vehicle 100, the process 400 may proceed to block 445. If the processor 155 determines that the water depth could cause hydrolock or other damage to the host vehicle 100, the process 400 may proceed to block 440.

At block 440, the flood detection system 105 commands the suspension system controller 125 to increase the ground clearance of the host vehicle 100. The processor 155 may output a control signal that, upon receipt at the suspension system controller 125, causes the suspension system controller 125 to output control signals to various actuators associated with the vehicle suspension system to increase the ground clearance. The process 400 may proceed to block 445 after the suspension is raised.

At decision block 445, the flood detection system 105 determines if the host vehicle 100 is operating in an autonomous mode. The processor 155 may determine that the host vehicle 100 is operating in the autonomous mode based on signals output by the autonomous mode controller 120. If the host vehicle 100 is operating in the autonomous mode, the process 400 may proceed to block 450. Otherwise, the process 400 may continue at block 465.

At block 450, the flood detection system 105 determines if the water is too high for the host vehicle 100. That is, the processor 155 may compare the water depth to a predetermined threshold based on the ground clearance, which could be the adjusted ground clearance at block 440. If the processor 155 determines that the water depth exceeds the predetermined threshold, the process 400 may proceed to block 455. If the processor 155 determines that the water depth does not exceed the predetermined threshold, the process 400 may proceed to block 460.

At block 455, the flood detection system 105 instructs the host vehicle 100 to seek a different route. That is, the processor 155 outputs a command to the autonomous mode controller 120 instructing the autonomous mode controller 120 to seek a different route. In some possible implementations, the processor 155 commands the communication system 135 to transmit a message to the remote server 110 indicating the presence of the flood water, the location of the host vehicle 100 where the flood water was detected, etc. The processor 155 may further provide the autonomous mode controller 120 with weather data and traffic data received from the remote server 110 at, e.g., block 430. The autonomous mode controller 120 may develop a new route according to the information output by the navigation system. The process 400 may return to block 405 after block 455.

At block 460, the flood detection system 105 instructs the host vehicle 100 to proceed through the flood water. The processor 155 may output a control signal to the autonomous mode controller 120 limiting the operation of the host vehicle 100 to, e.g., a reduced speed, at least until the host vehicle 100 has cleared the flood. The process 400 may return to block 405 after block 460. In some instances, the process 400 may return to block 430 so that the water depth can be periodically evaluated and so a different course of action (e.g., finding a new route) may be taken.

At block 465, the flood detection system 105 determines if the water is too high for the host vehicle 100. That is, the processor 155 may compare the water depth to a predetermined threshold based on the ground clearance, which could be the adjusted ground clearance at block 440. If the processor 155 determines that the water depth exceeds the predetermined threshold, the process 400 may proceed to block 470. If the processor 155 determines that the water depth does not exceed the predetermined threshold, the process 400 may proceed to block 475.

At block 470, the flood detection system 105 alerts the driver and recommends a new route. That is, the processor 155 may command the user interface 130 to present an alert indicating that the road is flooded, the water depth, etc., and a recommendation that the driver seek a different route. The processor 155 may further command the user interface 130 to present different routes based on data received from the navigation system, the remote server 110, etc. In some possible implementations, the processor 155 commands the communication system 135 to transmit a message to the remote server 110 indicating the presence of the flood water, the location of the host vehicle 100 where the flood water was detected, etc. The process 400 may return to block 405. In some instances, the process 400 may return to block 430 in case the driver ignores the warning so that the water depth can be periodically evaluated and additional alerts can be presented, especially if the water is getting deeper. Further, in instances where the processor 155 determines that the driver has ignored the warning, the processor 155 may command the communication system 135 to transmit an alert to an emergency service provider requesting help.

At block 475, the flood detection system 105 alerts the driver of the water height. The processor 155 may command the user interface 130 to present an alert indicating that a flood has been detected. The processor 155 may further command the user interface 130 to present the water depth, if known. In some possible implementations, the processor 155 commands the communication system 135 to transmit a message to the remote server 110 indicating the presence of the flood water, the location of the host vehicle 100 where the flood water was detected, etc. The process 400 may return to block 405 after block 475. In some instances, the process 400 may return to block 430 so that the water depth can be periodically evaluated and so a different course of action (e.g., recommending a new route) may be taken.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory 150, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle computer comprising:
a memory; and a processor programmed to execute instructions stored in the memory, the instructions including:
receiving a first tire pressure of a first tire at a first time;
receiving a second tire pressure of the first tire at a second time;
comparing the first tire pressure to the second tire pressure; and
determining that a road is flooded based on (a) a difference of the first tire pressure and the second tire pressure, and (b) ruling out a false positive by:
receiving a third tire pressure of a second tire;
receiving a fourth tire pressure of the second tire after receiving the third tire pressure; and
confirming that the road is flooded based on comparing (a) the difference of the first and second tire pressures of the first tire to (b) a difference of the third and fourth tire pressures of the second tire.

2. The vehicle computer of claim 1, wherein comparing the first tire pressure to the second tire pressure includes determining a rate of change of the second tire pressure relative to the first tire pressure, comparing the rate of change to a predetermined threshold, determining that the rate of change exceeds the predetermined threshold, and determining that the road is flooded as a result of determining that the rate of change exceeds the predetermined threshold.

3. The vehicle computer of claim 1, wherein ruling out the false positive further includes:
receiving a first exhaust gas temperature;
receiving a second exhaust gas temperature after receiving the first exhaust gas temperature;
comparing the first exhaust gas temperature to the second exhaust gas temperature; and
determining that the road is flooded based on a difference of the first exhaust gas temperature and the second exhaust gas temperature.

4. The vehicle computer of claim 1, wherein ruling out the false positive further includes comparing images of an area around a host vehicle and determining that the road is flooded based on similarities in the images resulting from flood water hiding distinguishing road features.

5. The vehicle computer of claim 1, the instructions further including determining a water depth.

6. The vehicle computer of claim 5, wherein determining the water depth includes querying a remote server and determining the water depth from a response received from the remote server.

7. The vehicle computer of claim 5, wherein determining the water depth includes estimating the water depth based at least in part on the difference of the first tire pressure and the second tire pressure.

8. The vehicle computer of claim 5, wherein determining the water depth includes estimating the water depth based at least in part on a difference of a first exhaust gas temperature to a second exhaust gas temperature.

9. The vehicle computer of claim 1, the instructions further including adjusting a ground clearance of a host vehicle based on determining the road is flooded.

10. The vehicle computer of claim 9, wherein adjusting the ground clearance of the host vehicle includes commanding a suspension system controller to increase the ground clearance.

11. The vehicle computer of claim 1, the instructions further including determining that a host vehicle is operating in an autonomous mode.

12. The vehicle computer of claim 11, the instructions further including comparing a water depth to a predetermined threshold, determining that the water depth exceeds the predetermined threshold, and commanding an autonomous mode controller to seek a different route as a result of determining that the water depth exceeds the predetermined threshold.

13. The vehicle computer of claim 1, the instructions further including determining that a host vehicle is operating in a non autonomous mode and commanding a user interface to present an alert representing at least one of an indication that the road is flooded, a water depth, an indication of whether the host vehicle can traverse the road, and a recommendation of a different route.

14. A method comprising:
receiving a first tire pressure of a first tire from a first tire pressure sensor at a first time;
receiving a second tire pressure of the first tire from the first tire pressure sensor at a second time;
comparing the first tire pressure to the second tire pressure; and
determining that a road is flooded based on (a) a difference of the first tire pressure and the second tire pressure, and (b) ruling out a false positive by:
receiving a third tire pressure of a second tire;
receiving a fourth tire pressure of the second tire after receiving the third tire pressure; and
confirming that the road is flooded based on comparing (a) the difference of the first and second tire pressures of the first tire to (b) a difference of the third and fourth tire pressures of the second tire.

15. The method of claim 14, wherein comparing the first tire pressure to the second tire pressure includes determining a rate of change of the second tire pressure relative to the first tire pressure, comparing the rate of change to a predetermined threshold, determining that the rate of change exceeds the predetermined threshold, and determining that the road is flooded as a result of determining that the rate of change exceeds the predetermined threshold.

16. The method of claim 14, further comprising:
determining a water depth,
comparing a water depth to a predetermined threshold,
determining that the water depth exceeds the predetermined threshold, and
commanding an autonomous mode controller to seek a different route as a result of determining that the water depth exceeds the predetermined threshold.

17. The method of claim 14, further comprising:
determining that a host vehicle is operating in a non autonomous mode; and
commanding a user interface to present an alert representing at least one of an indication that the road is flooded, a water depth, an indication of whether the host vehicle can traverse the road, and a recommendation of a different route.

18. The method of claim 14, wherein ruling out the false positive further includes:
receiving a first exhaust gas temperature;
receiving a second exhaust gas temperature after receiving the first exhaust gas temperature;
comparing the first exhaust gas temperature to the second exhaust gas temperature; and
determining that a road is flooded based on a difference of the first exhaust gas temperature and the second exhaust gas temperature.

19. The method of claim 14, wherein ruling out the false positive further includes:
comparing images of an area around a host vehicle and determining that the road is flooded based on similarities in the images resulting from flood water hiding distinguishing road features.

20. The method of claim 14, further comprising adjusting a ground clearance of a host vehicle based on determining the road is flooded.

* * * * *